ANALOG TO DIGITAL CONVERTER

Filed Oct. 21, 1965 6 Sheets-Sheet 1

INVENTORS:
Gerald F. Frank
Rene M. Iadipaolo
By Amyth, Rosten & Pavitt
Attorneys INVENTORS.
Gerald F. Frank
Rene M. Iadipaolo
By Smyth, Roston & Pavitt
Attorneys INVENTORS:
Gerald F. Frank
Rene M. Iadipaolo
By [signature]
Attorneys Feb. 9, 1971 G. F. FRANK ET AL 3,562,739

ANALOG TO DIGITAL CONVERTER

Filed Oct. 21, 1965 6 Sheets-Sheet 4

INVENTORS:
Gerald F. Frank
Rene M. Iadipaolo
By Smyth, Roston & Pavitt
Attorneys Feb. 9, 1971 G. F. FRANK ET AL 3,562,739

ANALOG TO DIGITAL CONVERTER

Filed Oct. 21, 1965 6 Sheets-Sheet 5

INVENTORS:
Gerald F. Frank
Rene M. Iadipaolo

By Smyth, Roston & Pavitt
Attorneys

ANALOG TO DIGITAL CONVERTER

Filed Oct. 21, 1965 6 Sheets-Sheet 6

INVENTORS
Gerald F. Frank
Rene M. Iadipaolo
By Smyth, Roston & Pavitt
Attorneys 3,562,739

ANALOG TO DIGITAL CONVERTER

Gerald F. Frank, Normal, Ill., and Rene M. Iadipaolo, Hawthorne, Calif., assignors to Minnesota Mining and Manufacturing Company, St. Paul, Minn., a corporation of Delaware Filed Oct. 21, 1965, Ser. No. 499,398
Int. Cl. G08c 9/06
U.S. Cl. 340—347 2 Claims

ABSTRACT OF THE DISCLOSURE

The present invention is directed to an improved optical code wheel for use in an analog to digital converter wherein the code wheel includes a plurality of concentric tracks each having binary coded decimal information and where each concentric track has opaque and translucent portions representing off and on states of a particular weighted numerical value and with all but one of the concentric tracks grouped together in pairs and with a first one of each pair of tracks representing the same weighted numerical value as the second one of each pair of tracks and with the first ones of each pair of tracks physically displaced to lead the second one of each pair of tracks so that alternate ones of the first and second ones of each pair of tracks may be preset relative to the other. An output signal is derived by switching between the information represented by the first ones of each pair of tracks and the second ones of each pair of tracks. The invention also includes an improved lamp assembly including a flexible member and with a plurality of individual adjustment means operating against the flexible member to individually adjust the position of light sources.

This invention relates to analog to digital conversion systems and specifically the invention relates to an analog to digital converter. In particular, the invention relates to an analog to digital converter for producing a binary coded decimal signal, having characteristics in accordance with an angular position.

As part of the broader aspects of the invention, the analog to digital conversion system uses a coding system which produces changes in the binary coded decimal signal in accordance with changes in the angular position but without any ambiguity being produced as the binary coded decimal signal changes its value. The analog to digital converter uses a code wheel constructed in accordance with the coding system of the invention, and, in addition, the converter uses a pickup also designed in accordance with the coding system of the invention.

In the prior art, analog to digital converters for use in converting an analog signal to a binary coded decimal signal generally used a coding system which incorporates a single code track for each bit of the binary coded decimal signal. For example, a four bit binary coded decimal signal may represent the decimal values of 0 to 9 as shown below:

| Decimal value | Binary coded decimal representation Zero (0)="Off" One (1)="On" | | | |
|---|---|---|---|---|
| | One's bit track | Two's bit track | Four's bit track | Eight's bit track |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

As can be seen in the diagram above, a single track is used for each bit of the binary coded decimal signal. Specifically, four tracks are used to represent respectively the one's bit, the two's bit, the four's bit and the eight's bits. As shown above, the various states, or "On-Off" conditions of the four tracks, represent the decimal value. In the diagram shown above, a zero (0) represents an "Off" state for the track to indicate the absence of an output signal, and a one (1) represents an "On" state for the track to indicate the persence of an output signal. For example, the decimal value 3 is represented by having the one's bit. "On," the two's bit "On" and the four's and eight's bits "Off." This, of course, is a standard binary system. It is to be appreciated that the coding system could be varied, for example, by having the "Off" state repersent the presence of an output signal and the "On" state represent the absence of an output signal.

In order to reflect changes in the decimal value of the binary coded decimal signal, the states of the tracks are changed in accordance with the changes in the input analog information which is to be represented by the binary coded decimal signal. For example, when the input analog information changes so as to produce a change in the binary coded decimal signal from a decimal representation of zero to a decimal representation of one, the one's bit track must change its state from "Off" to "On." The change in the one's bit track is the only change that is necessary in that particular situation.

When there is only one change of state for the group of bits, as illustrated in the foregoing example, the binary coded decimal signal does not pass through any serious ambiguities. For example, in changing from a representation of a decimal value of zero to a decimal value of one, the only ambiguity which can arise is in a fluctuation in the one's bit track between the "Off" and "On" state before stabilizing in the "On" state. The fluctuation in the one's bit track also shows up as a fluctuation in the binary coded decimal signal. The ambiguity is a particular problem when the analog to digital converter is responding to slow changes in the input signal. This type of momentary ambiguity, however, is not serious as long as it can be relegated to the one's bit track so that it does not greatly disturb the overall operation of the analog to digital converter.

If, however, the binary coded decimal signal is changing from a representation of a decimal value of one to a decimal value of two, then the binary coded decimal signal experiences two changes of state in the group of bits. That is, the one's bit goes from "On" to "Off," whereas the two's bit goes from "Off" to "On." As the state of the bits are changing, three possible conditions can occur in the binary coded decimal signal. The first condition is that the one's bit goes "Off" before the two's bit goes "On," thereby giving a momentarily false binary coded decimal signal representing the decimal value of zero. The second condition is that the two's bit goes "On" before the one's bit goes "Off," therby giving a monentarily false binary coded decimal signal representing the decimal value of three. The last condition is that the one's bit goes "Off" at the same time that the two's bit goes "On," thereby giving the correct binary coded decimal signal representing the decimal value of two.

The momentarily false binary coded decimal signals as explained above produce corresponding ambiguities in the output signal from the analog to binary converter, since the output signal often is merely an amplified version of the binary coded decimal signal. If the binary coded decimal signal represents a steadily increasing analog signal but the binary coded decimal signal is jumping back and forth due to the above-described ambiguities, the binary coded decimal signal may have adverse effects on later stages to which the analog to digital converter supplies signals. For example, if the binary coded decimal signal is used to provide a control function, such as controlling a servo, the servo, instead of having a steady control, would fluctuate back and forth in response to the ambiguities in the binary coded decimal signal. It is seen, therefore, that the elimination of these ambiguities would be highly desirable in order to provide a steady and accurate output signal from the analog to digital converter.

One suggested solution to the above-described problem of ambiguity in the binary coded decimal signal is to use a different non-ambiguous type of coding system generally known as a Grey coding system. In the Grey coding system, only one bit changes for each successive increase or decrease in the decimal number to be represented. That is, when the Grey coded signal represents a decimal value of one there is only a change of one bit when the Grey coded signal changes to represent a decimal value of two. This change of only one bit, of course, is in contrast to a standard binary coded decimal system.

However, the use of the Grey coding system creates other types of difficulties. The Grey coding system is a nonstandard coding system and everything within the analog to digital converter, and any additional equipment which may be tied in with the analog to digital converter must be specifically designed to operate properly with the Grey system. An analog to digital converter using the Grey coding system therefore would not be compatible with other standard components. If the analog to digital converter were designed to convert the Grey coded signal to a standard binary coded decimal signal, this would greatly increase the components within the analog to digital converter since the Grey code is romplicated and it is difficult to convert from a Grey coding system to a binary coded decimal system.

The invention as presented in the present application solves the above problems of ambiguity in the output signal of an analog to digital converter, while at the same time retaining the use of the standard notation form which is the binary coded decimal system. The invention uses a coding system which has two tracks for each bit, except in the embodiment shown one track is used for the one's bit. For example, with a four bit binary coded decimal signal which represents decimal values of 0–9, a total of seven tracks are used: one track for the one's bit, two tracks for the two's bit, two tracks for the four's bit, and two tracks for the eight's bit. In an eight bit binary coded decimal signal which represents decimal values of 0 to 99, a total of fifteen tracks are used and in the embodiment ilustrated in this application having twelve bits to represent decimal values of 0 to 999, a total of twenty-three tracks are used.

No matter how many bits are used so as to count to higher and higher decimal digits, the one's bit track in a binary coded decimal system always alternates between an "Off" and an "On" position at each discrete change in the counting procedure. The fact that the one's bit alternates between the "Off" and "On" states is used in the invention to control which ones of the other bit tracks are used in the analog to digital conversion. This is accomplished by grouping all of the other bit tracks other than the one's bit track into one of the two groups. For example, in a four bit binary coded decimal system, one of the two's bit tracks, one of the four's bit tracks and one of the eight's bit tracks are grouped together to form a first group. The other of the two's bit tracks, the other of the four's bit tracks and the other of the eight's bit tracks are also grouped together to form a second group. The first group is designated in this application by the value of the bit. For example, the two's bit in the first group is represented by the number 2. The two's bit in the second group is designated by the value of the bit plus a prime symbol. For example, 2'.

One of the two groups of tracks is designated to lead the other group. This leading by one of the two groups of tracks is used to provide stability in the binary coded decimal signal. When the one's bit is in the "Off" state, the first one of the groups of tracks is read. Then the one's bit is on the "On" state the second one of the groups of tracks is read. Since there is a switching back and forth as to which one of the groups of tracks is read with each change in the one's bit, the group of tracks which is not being read can be preset so that when that group is then read when the one's bit changes the output signal is stable. The one's bit is used to provide the control signal to determine which of the groups of tracks is to be read. The system can be seen more clearly with reference to the following simplified diagram:

| Decimal value | Binary coded decimal representation— Zero (0)="Off" One (1)="On" | | | | | | |
|---|---|---|---|---|---|---|---|
| | One's bit track | Two's bit tracks | | Four's bit tracks | | Eight's bit tracks | |
| | | 2 | 2' | 4 | 4' | 8 | 8' |
| 0 | $\underline{0}$ | $\underline{0}$ | 0 | $\underline{0}$ | 0 | $\underline{0}$ | 0 |
| 1 | $\underline{1}$ | 1 | $\underline{0}$ | 0 | $\underline{0}$ | 0 | $\underline{0}$ |
| 2 | $\underline{0}$ | $\underline{1}$ | 1 | $\underline{0}$ | 0 | $\underline{0}$ | 0 |
| 3 | $\underline{1}$ | 0 | $\underline{1}$ | 1 | $\underline{0}$ | 0 | $\underline{0}$ |
| 4 | $\underline{0}$ | $\underline{0}$ | 0 | $\underline{1}$ | 1 | $\underline{0}$ | 0 |
| 5 | $\underline{1}$ | 1 | $\underline{0}$ | 1 | $\underline{1}$ | 0 | $\underline{0}$ |
| 6 | $\underline{0}$ | $\underline{1}$ | 1 | $\underline{1}$ | 1 | $\underline{0}$ | 0 |
| 7 | $\underline{1}$ | 0 | $\underline{1}$ | 0 | $\underline{1}$ | 1 | $\underline{0}$ |
| 8 | $\underline{0}$ | $\underline{0}$ | 0 | $\underline{0}$ | 0 | $\underline{1}$ | 1 |
| 9 | $\underline{1}$ | 0 | $\underline{0}$ | 0 | $\underline{0}$ | 0 | $\underline{1}$ |

NOTE.—Underlining indicates bits being read for each decimal value.

In the above diagram the one's bit successively changes from "Off" to "On" with each change in the decimal value of the binary coded decimal signal. The two's bit is shown divided into two tracks, the 2 track and the 2' track. This same system of notation is followed with the four's and the eight's bits tracks. When the binary coded decimal signal represents a decimal value of zero, all of the tracks are in the "Off" position. The underlining indicates which of the bits are being read, so as to constitute the binary coded decimal signal for any particular decimal value. It can be seen that for the decimal value of zero, the 1 track, 2 track, 4 track and the 8 track are being read since these tracks are underlined.

When the analog to digital converter receives an input signal to produce a binary coded decimal signal to represent a decimal value of one, the 1 track is in the "On" position. At the same time the 2 track is in the "On" position, the 2' track is in the "Off" position and all the other tracks are in the "Off" position. When the 1 track changes from the "Off" to the "On" position, the 2' track is read instead of the 2 track. This can be seen from the above diagram since the 2' track is underlined.

At the same time that the 2' track is being read, the 2 track is being preset for an increase in decimal value of the binary code decimal signal. This presetting is used when the binary coded decimal signal changes to represent a decimal value of two. At that time the 1 track switches back to the "Off" position and controls the reading of the 2 track instead of the 2' track. Since the 2 track has been preset before the 1 track switches to the "Off" position the 2 track is in a stable condition. This type of presetting of a track before reading the track continues throughout all of changes in the binary coded decimal signal.

The above diagram is somewhat simplified, since it shows that the presetting occurs at one complete count before the switching occurs. This type of presetting would be a good system if the analog to digital converter always counted in a positive direction which would indicate that the binary coded decimal signal always represented increasing decimal values. However, in the actual embodiment of the invention, the presetting does not occur one complete count before switching, since it is desirable to have a presetting before both increasing and decreasing counts. For example, it would be desirable to have a presetting occur when the binary coded decimal signal is changing in its representation of a decimal value of four to a decimal value of three.

The presetting in both directions is accomplished by having the presetting occurring at some time prior to the switching of states in the 1 track, but no one complete count as shown in the above diagram. For example, in the above diagram, the presetting of the 2′ track actually occurs somewhere between the changing of the 1 track from the "Off" to the "On" position. Additionally, the condition of the 2′ track is maintained until somewhere between the changing of the 1 track from the "On" to the "Off" position so that the presetting is accomplished in both directions. This overlapping, so as to allow the presetting in both directions, will be clearer with reference to the specific embodiment disclosed in this application.

The invention is disclosed in this application with a specific embodiment of an analog to digital converter which converts from an angular rotation to a binary coded decimal signal. The embodiment of the analog to digital converter shown in this application operates on optical techniques and is designed to provide a three digit output signal coded by using the binary coded decimal system. Since the embodiment of the invention illustrated in this application provides binary coded decimal signals which have decimal values of 0 to 999, twenty-three tracks are used within the analog to digital converter to provide twelve output tracks for the binary coded decimal signal. The specific embodiment of the invention illustrated in this application uses a code wheel subdivided into twenty-three concentric bit tracks, with each track having alternate translucent and opaque areas to provide the "On" and "Off" states of the track. The specific value of the binary coded decimal signal is dependent upon the angular position of the code wheel.

A light source constructed so as to provide maximum uniform light energy along a line is set up to direct the light energy radially across the code wheel. The light energy passes through the code wheel and is modified in accordance with corresponding translucent and opaque areas in each of the tracks. A photosensitive pickup means is disposed of adjacent the code wheel and is subdivided into individual photosensitive cells, each disposed adjacent one of the tracks on the code wheel. The photosensitive pickup means is subdivided into the individual photosensitive cells even though the body of the pickup means is a single unitary structure. Each individual photosensitive cell is composed of an N-P junction and the active area of each junction is smaller than a particular area representing an individual bit. The presence or absence of light is detected at the individual photosensitive cells, depending on whether the photosensitive cells are opposite translucent or opaque areas of the tracks. The individual photosensitive cells operate by producing a current flow through the N-P junction whenever light energy strikes an exposed P-area, thereby creating signals representing the presence or absence of light energy.

The signals from the photosensitive cells are directed to an electrical circuit which chooses the correct signals in accordance with the state of the one's bit track. The one's bit track thereby controls the passage of the correct signals at any particular angular position of the code wheel. A clearer understanding of the invention will be had with reference to the drawings wherein.

Figure 1:
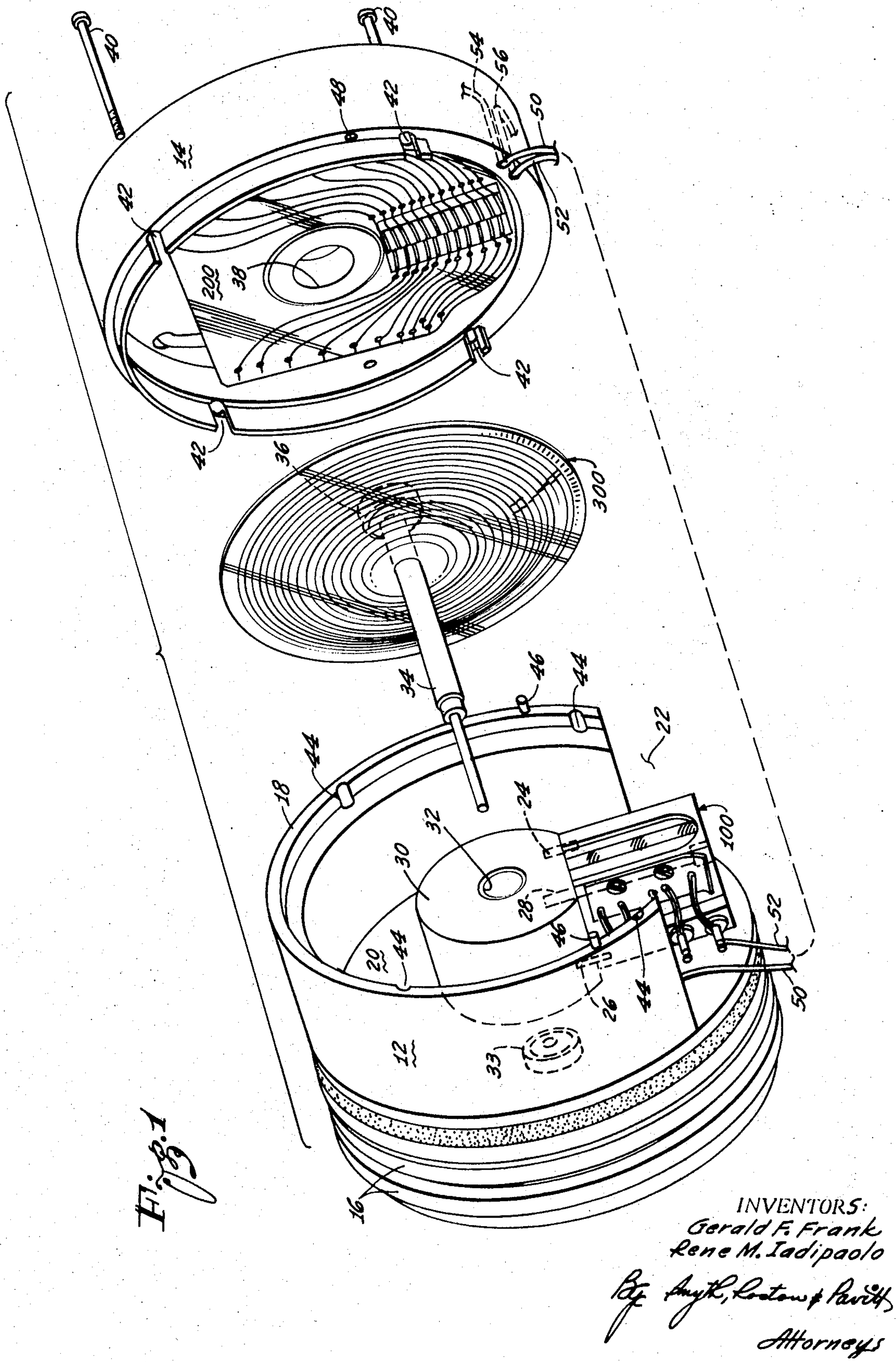
FIG. 1 illustrates an exploded view of a specific embodiment of the analog to digital converter using optical techniques.

In FIG. 1 there is illustrated an exploded view of a specific embodiment of an analog to digital converter 10. The analog to digital converter 10 of FIG. 1 includes a front housing 12 and a rear housing 14. The front housing 12 has a generally cylindrical shape and includes concentric flanges 16 which are used by mounting the analog to digital converter 10. The front housing 12 includes a cylindrical outer wall 18 which extends from a floor 20.

The cylindrical outer wall 18 is cut away as illustrated at position 22 to allow the insertion and removal of a lamp assembly 100. The lamp assembly 100 will be described in greater detail at a later portion of the specification. The lamp assembly 100 is positioned within the front housing 12 by the use of pins 24 and 26. The lamp assembly 100 is also rigidly maintained in a particular position within the front housing 12 through the use of a screw 28. The screw 28 extends through the lamp assembly 100 and into a member 30 of the front housing 12 which extends from the floor 20.

The member 30 of the front housing 12 includes a central opening 32. A bearing assembly 33 is positioned within the opening 32 and is adapted to receive a shaft 34. The shaft 34 freely rotates in the bearing assembly 33 at its one end and the shaft 34 additionally supports a second bearing assembly 36 at its other end. The second bearing assembly 36 is designed to fit within an opening 38 within the rear housing 14.

A photosensitive cell assembly 200 is disposed within the rear housing 14. The front and rear housings 12 and 14 are connected together using screws 40 which extend through openings 42 in the rear housing 14 and are received by openings 44 in the front housing 12. The proper position of the front and rear housings 12 and 14 is maintained through the use of pins 46 extending from the front housing 12 and which are offset from the center line to fit within openings 48 in the rear housing 14.

A code wheel 30 is rigidly maintained on the shaft 34. The code wheel 300 is intermediate the lamp assembly 100 and the photosensitive cell assembly 200. The photosensitive cell assembly 200 and the code wheel 300 will be explained in greater detail at a later portion of the specification. As can be seen in FIG. 1, the light energy which is radiated from the lamp assembly 100 is directed to the code wheel 300. The code wheel 300 includes opaque and translucent portions and the light energy is modulated in accordance with the opaque and translucent portions of the code wheel 300. The particular angular position of the code wheel 300 determines what portion of the code wheel 300 is adjacent the lamp assembly 100 and thereby determines the particular modulation of the light energy.

The light energy passing through the code wheel 300 at the particular angular position is picked up by the photosensitive cell assembly 200 and the photosensitive cell assembly 200 produces output signals in accordance with light energy. Electrical power to the lamp assembly 100 is supplied through wires 50 and 52 which pass through openings 54 and 56 to the inside of the rear housing 14.

Figure 2:
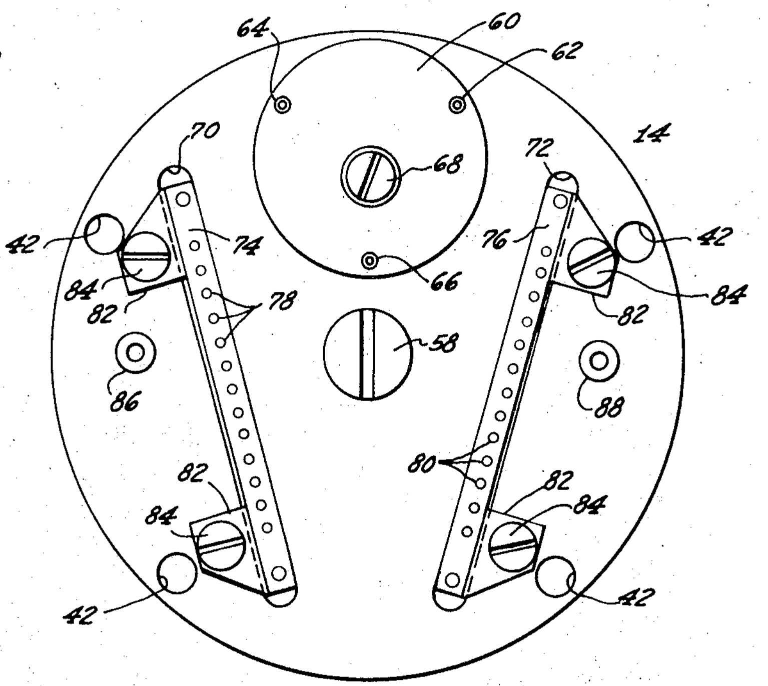
FIG. 2 illustrates a back view of the rear housing of the analog to digital converter of FIG. 1.

In FIG. 2, a back view of the rear housing 14 is shown. The holes 42 which receive the screws 40 shown in FIG. 1 are illustrated at four circumferential positions along the outside edge of the rear housing 14. A cap screw 58 is disposed in the center of the rear housing 14 and is used to adjust the position of the code wheel 300 relative to the photosensitive cell assembly 200. A recessed area 60 includes three pin members 62, 64 and 66. The pin members 62, 64 and 66 extend into the back of the photosensitive cell assembly 200 illustrated in FIG. 1 and maintain the photosensitive cell assembly 200 in a particular position. A screw 68 maintains the photosensitive cell assembly 200 in rigid connection within the rear housing 14.

A pair of electrical connectors 70 and 72 are arranged generally to form a V-shape. The electrical connectors 70 and 72 pass through the rear housing 14 so that the connectors 70 and 72 extend from the rear to the front of the rear housing 14. The electrical connectors 70 and 72 include insulating material 74 and 76 which support groups of metallic pins 78 and 80. The groups of metallic pins 78 and 80 also pass from the rear to the front of the rear housing 14. The electrical connectors 70 and 72 are maintained in position by flanges 82 which have screws 84 passing through them and into the rear housing 14.

Figure 3:
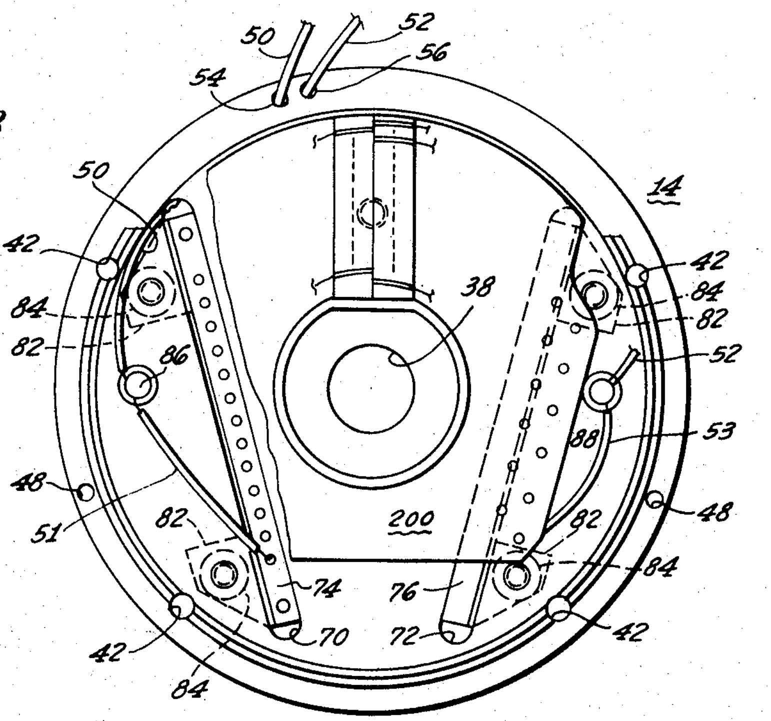
FIG. 3 shows an inside view of the rear housing of the analog digital converter of FIG. 1.

FIG. 3 illustrates an inside view of the rear housing 14 and uses the same reference characters for components shown in the preceding figures. In FIG. 3, the photosensitive cell assembly 200 is shown partially broken away and in its position within the rear housing 14. As can be seen in FIG. 3, the electrical connectors 70 and 72 have their metallic pins 78 and 80 disposed adjacent the rear of the photosensitive cell assembly 200. Some of the metallic pins 78 and 80 are electrically connected to individual ones of the photosensitive cells within the photosensitive cell assembly 200. The connection of the individual photosensitive cells to the metallic pins will be shown in greater detail at a later portion of the specification.

As shown in FIG. 1, wires 50 and 52 pass through opening 54 and 56 at the rear housing 14. The same openings 54 and 56 with the wires 50 and 52 passing through them are shown in FIG. 3. The wires 50 and 52 pass within the rear housing 14 and are connected to terminals 86 and 88. Wires 51 and 53 are connected between terminals 86 and 88 and particular ones of the metallic pins 78 and 80. In the operation of the analog to digital converter electrical power is applied to the particular ones of the metallic pins 78 and 80. The electrical power is then supplied to the terminals 80 and 88 through the wires 51 and 53. The electrical power is then supplied to the lamp assembly 100 through the wires 50 and 52 which are interconnected between the front and rear housing 12 and 14.

Figures 4, 5, 6:
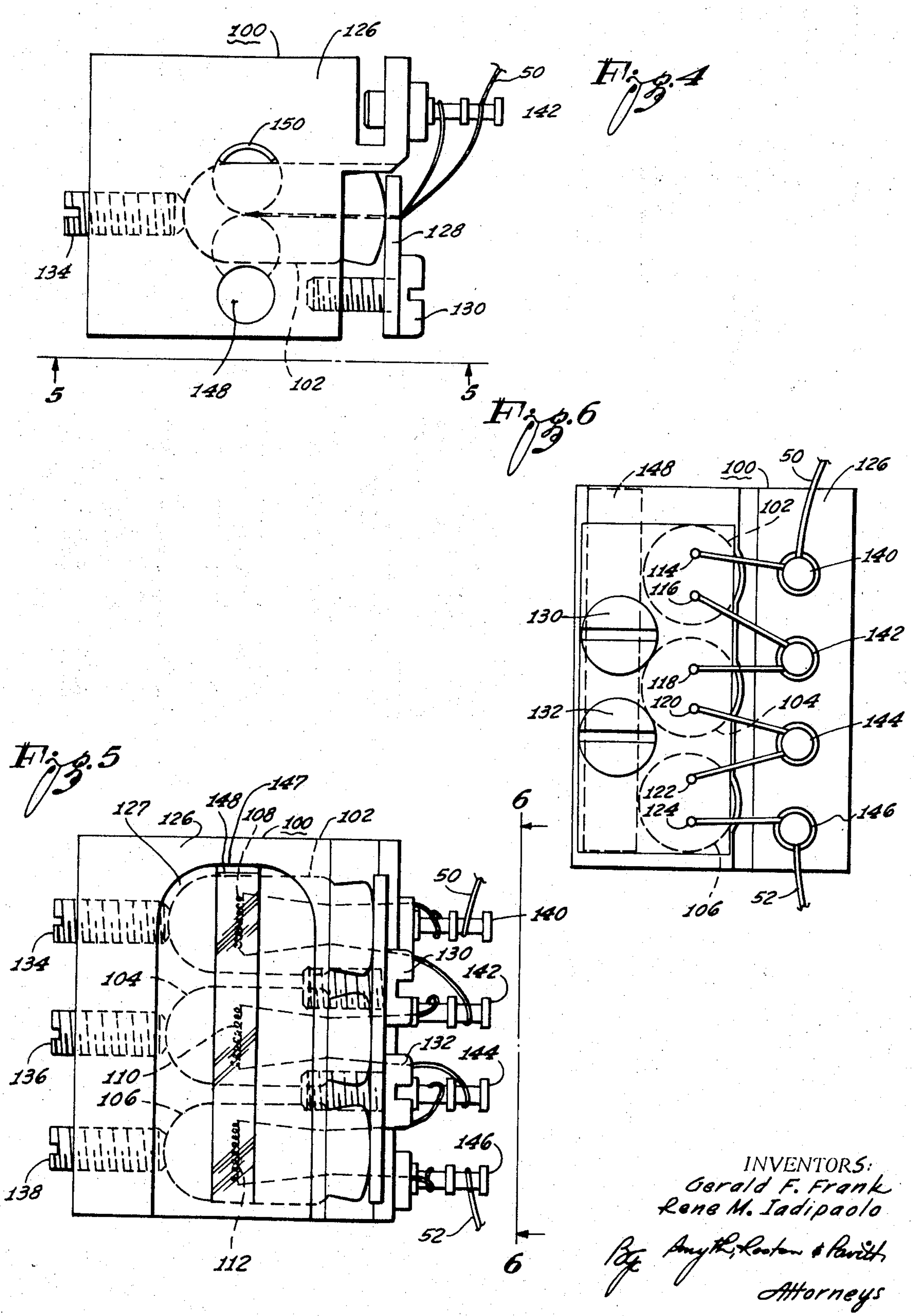
FIG. 4 illustrates an elevational view of the lamp assembly used with the analog to digital converter of FIG. 1.
FIG. 5 illustrates a view of the lamp assembly taken along line 5—5 in FIG. 4.
FIG. 6 illustrates a view of lamp assembly taken along line 6—6 in FIG. 5.

In FIG. 1 the lamp assembly 100 is shown in its operating position so as to provide light energy for the analog to digital converter 10. FIG. 4 illustrates an elevational view of the lamp assembly 100 showing the lamp assembly 100 in more detail. FIG. 5 illustrates a view of the lamp assembly 100 taken along line 5—5 in FIG. 4, and FIG. 6 illustrates a view of the lamp assembly 100 taken along line 6—6 in FIG. 5.

The lamp assembly 100 includes three incandescent lamps 102, 104 and 106. The incandescent lamps 102, 104 and 106 have outer glass cases which enclose filaments 108, 110 and 112 as shown in FIG. 5.

Each filament extends through and is sealed to the glass case to form terminals 114 through 124, as shown in FIG. 6. The lamp assembly has an outer housing 126. The incandescent lamps 102, 104 and 106 sit within an opening 127 in the housing 126 of the lamp assembly 100. One end of the incandescent lamps 102, 104 and 106 are maintained in position within the opening 127 by a flexible member 128 which is connected to the housing 126 through screws 130 and 132. The other end of the incandescent lamps 102, 104 and 106 are retained in position through the use of three screws 134, 136 and 138 which also pass through housing 126.

Since it is impossible to physically construct all incandescent lamps to have their filaments in exactly the same position within the glass enclosure, the lamp assembly 100 of the invention incorporates means for adjusting the position of the incandescent lamps so as to line up the filaments to produce a maximum uniform light from the lamp assembly 100. This adjustment is accomplished through the use of the screws 134, 136 and 138. The screws 134, 136 and 138 are adjusted to move the incandescent lamps 102, 104 and 106 relative to each other within the opening 127 in the housing 126. The adjustment of the lamps relative to each other is possible since the member 128 is designed to be very flexible. The screws therefore adjust the displacement of the incandescent lamps 102, 104 and 106 so that all the lamps produce the same light output at the same position and have the light output uniform across the face of the lamp assembly 100.

Electrical power is supplied to the incandescent lamps 102, 104 and 106 through the terminals 140, 142, 144 and 146. The incandescent lamps 102, 104 and 106 are all connected in series as shown in FIG. 6. Electrical power is supplied through the two outside terminals 140 and 146 and from the wires 50 and 52. As can be seen in FIG. 5, the lamp assembly 100 has a long, narrow, cutout 147 which extends from the opening 127 to the face of the housing 126. A lens 148 is disposed within this cut out 147.

The lens 148 can also be seen with reference to FIGS. 4 and 6 and the lens 148 has a rodlike shape. It is to be appreciated that the lens may take other forms and is not to be limited to a rodlike shape. The lens 148 focuses the light energy from the incandescent lamps 102, 104 and 106 to a narrow line of light. In addition, the lens 148 diffuses the light energy along its length so that the light energy is uniform along the narrow line. In order to increase the intensity of the light energy from the lamp assembly 100, a reflector element 150 is placed at the rear of the opening 127 within the housing 126. The reflector element 150 is lightly reflective and is shaped so as to collect the light energy from the incandescent lamps and direct it toward the lens element 148.

Figure 7:
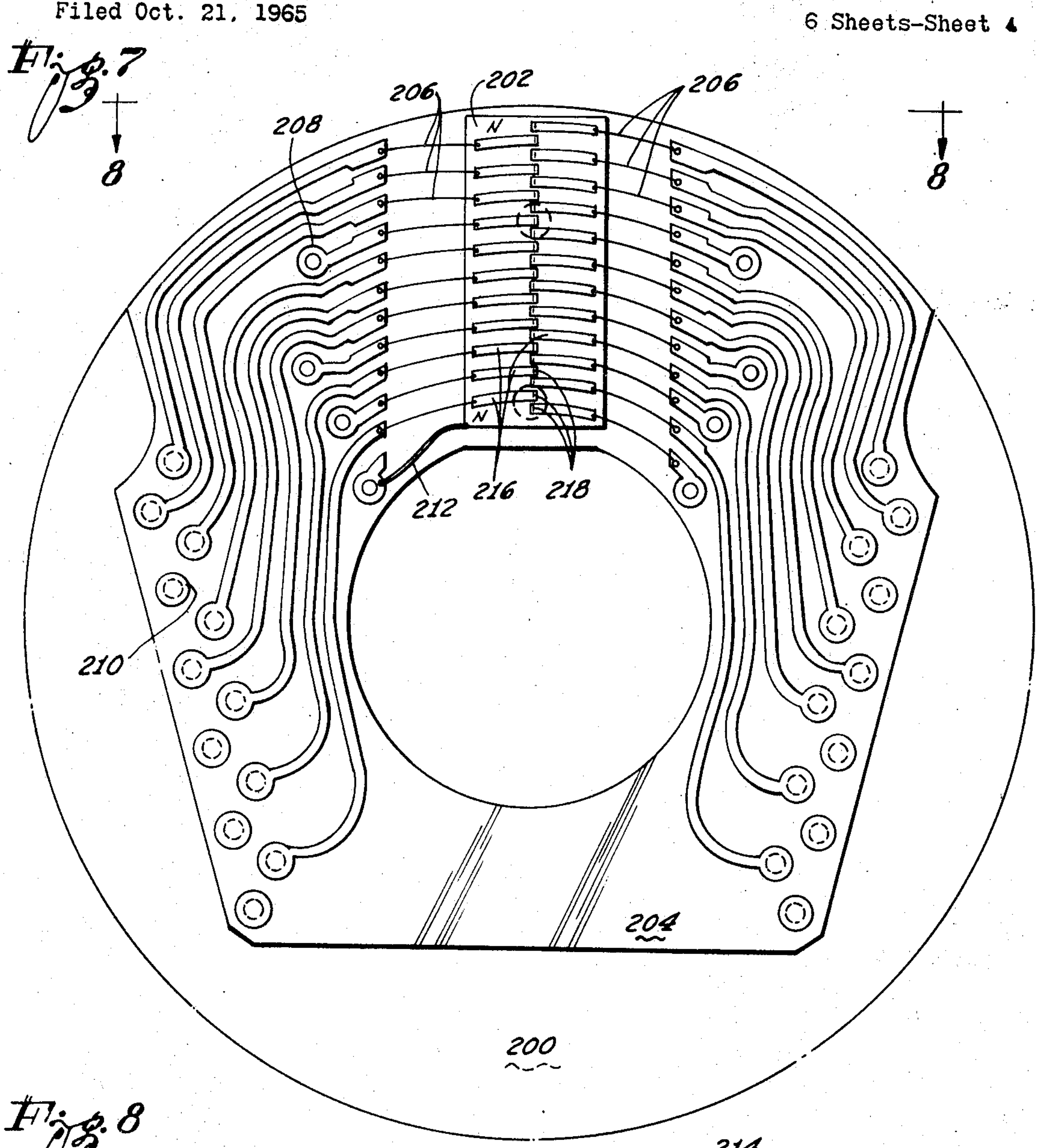
FIG. 7 illustrates an elevational view of the photosensitive cell assembly used with the analog to digital converter of FIG. 1.

FIG. 7 illustrates the photosensitive cell assembly 200. The photosensitive cell assembly 200 includes a photosensitive cell unit 202 mounted on a printed circuit board 204. The photosensitive cell unit 202 includes a plurality of individual cells, one for each track on the code wheel 300. A printed circuit board 204 has printed circuit wiring on both sides of the board. The printed circuit board 204 includes an individual printed circuit wire for each individual cell of the photosensitive cell unit 202 and one additional wire for a base connection to the body of the photosensitive cell unit 202.

The individual cells are connected to the printed circuit wiring through the use of leads 206. Where it is difficult to run the wiring on the top surface of the printed wiring board 204 due to crowded conditions, a print-through hole is used as shown at position 208, and the printed wire is run on the opposite side of the board and is connected to a second print-through hole as shown at position 210. A separate lead 212 is used to connect the base of the photosensitive cell unit 202 to a printed wire on the board 204.

The photosensitive cell unit 202 is recessed slightly into the printed circuit board 204 and the photosensitive cell unit 202 may be maintained in position by any appropriate means, such as an epoxy glue. The entire photosensitive cell assembly 200 is positioned within the rear housing 14 through the use of a block 214 shown in FIG. 8 which mates with pins 62, 64 and 66 and screw 68, all shown in FIG. 2. The printed wiring on the printed circuit board 204 is connected to the electrical connectors 70 and 72 shown in FIGS. 2 and 3 through the use of wires 220 shown in FIG. 8.

Figure 8:
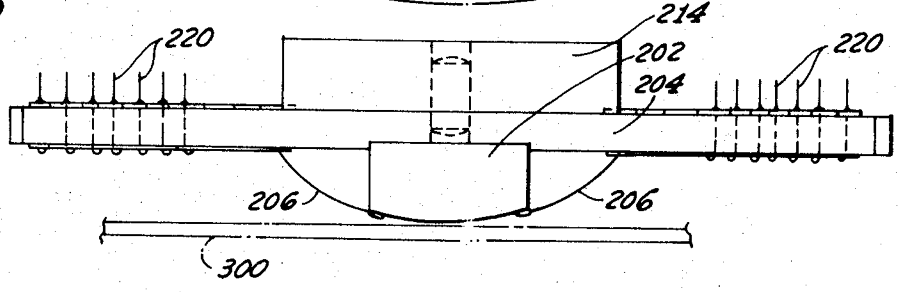
FIG. 8 illustrates a view of the photosensitive cell assembly taken along line 8—8 in FIG. 7.

As illustrated in FIG. 8, the photosensitive cell unit 202 is disposed in a position within the analog to digital converter 10 so that the photosensitive cell unit 202 is adjacent to, but not quite touching the code wheel 300. The face of the photosensitive cell unit 202 is curved so that the wires 206, at their point of connection to the photosensitive cell unit 202, does not touch the code wheel 300 while still allowing the center portion of the photosensitive cell unit 202 to be close to the code wheel 300. The center portion of the photosensitive cell unit 202 contains the active photosensitive area of the photosensitive cell unit 202. The particular structure of the photosensitive cell unit 202 is shown more clearly with reference to FIG. 7.

The photosensitive cell unit 202 uses a N-P junction for its photosensitive element. The photosensitive cell unit 202 is constructed to have a main block of N-material which operates as a base. Individual sections on the surface of the block of N-material are covered with P-material. In the embodiment of the invention disclosed in this application there are twenty-three such individual areas of P-material on the surface of the block of N-material. The areas of P-material are collectively referred to by reference numeral 216 in FIG. 7.

It is not desirable to have a large area of P-material exposed to the light energy since the P-material would then be subject to extraneous light energy. Moreover, it is desirable to have the area of P-material that is exposed to light energy very small so that the individual photosensitive cells are responsive to individual bit positions on the code wheel. However, there must be a sufficient area of P-material so that an electrical connection can be made to the P-material. This dilemma is solved by using a relatively large area of P-material, as shown by areas 216, but the P-material is masked with a metallic substance, such as nickel, except at selected portions 218. As can be seen in FIG. 7, the areas of P-material 218, which are exposed to light energy all run along a longitudinal center line on the surface of the photosensitive cell unit 202. The nickel which covers most of the P-material effectively acts both as a light energy mask for the P-material and at the same time provides for an electrical connection to the P-material. The photosensitive cell unit 202 is thereby effectively subdivided into a plurality of individual photosensitive cells, each having very small active exposed area of P-material, but yet providing for connection to these active areas.

As light passes through the code wheel 300 and impinges on the active areas of P-material 218, the light energy produces a current flow through the N-P junction. A current flow through the N-P junction therefore indicates the presence of light energy at a particular active area. The presence or absence of current flow is therefore an output signal indicating when each active area is receiving light entry or not. The reception of light energy is directly dependent upon whether the active area is adjacent a translucent or opaque portion of the code wheel. It can be seen therefore that the translucent and opaque areas on the code wheel directly control the output signals from the photosensitive cell unit 202. In order to accurately pickup information from all of the tracks on the code wheel, the photosensitive cell unit 202 must include a plurality of separate individual photosensitive cells, all perfectly aligned and having discrete active areas arranged to complement the code pattern on the code wheel. The photosensitive cell unit 202 of the invention provides for the above and additionally includes a metallic substance, such as nickel, operating as both a light mask for the active areas and an electrical connection to the active areas of the unit 202. The individual output signals pass from the photosensitive cell unit 202 through the leads 206 and to the printed circuit on the board 204. The output signals are then transferred to the electrical connectors 70 and 72 shown in FIG. 2 through the use of the plurality of leads 220, illustrated in FIG. 8.

Figure 9:
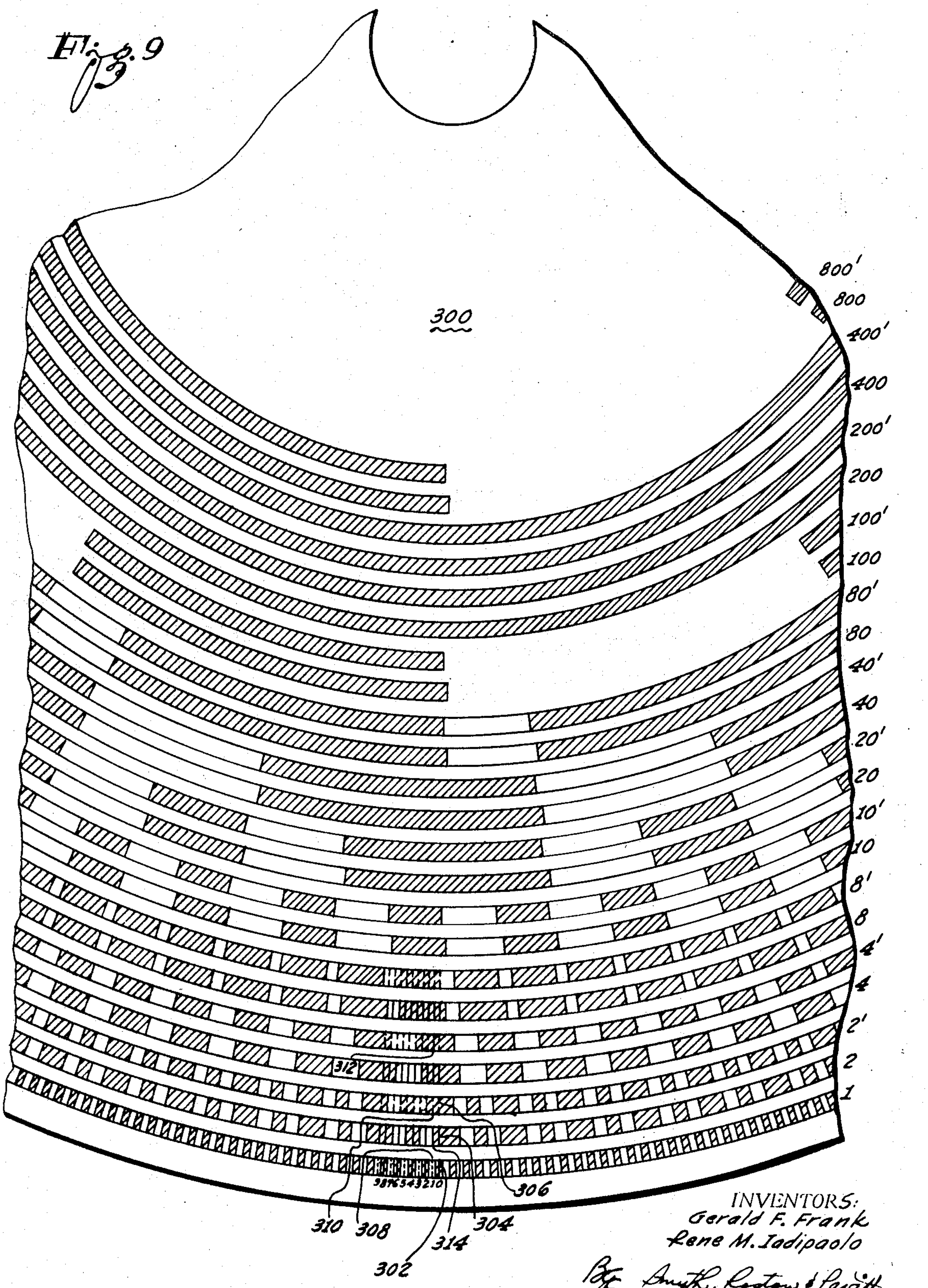
FIG. 9 illustrates a partial detailed view of the code wheel used with the analog to digital converter of FIG. 1.

FIG. 9 illustrates a fragmentary view of the code wheel 300 and shows in detail how the coding system of the invention is incorporated in an analog to digital converter using optical techniques. As can be seen in FIG. 9, the code wheel 300 includes twenty-three tracks, with each track representing a bit of information, having weighted values as shown along the righthand side of the code wheel. All of the bits with the exception of the one's bit have two tracks associated with them. For example, there is a 2 and a 2′ track both associated with the two's bit and a 4 and 4′ track both associated with the four's bit. The coding system therefore uses a number of tracks equal to two times the number of bits less one. For example, in the illustrated embodiment there are a total of twelve bits to represent three decimal digits. The number of tracks is therefore equal to two times the number of bits or twenty-four less one, which is a total of twenty-three tracks for the twelve bits.

There is only one track for the one's bit and the one's bit track serves not only as an informational track to provide indications of whether the one's bit is "Off" or "On," but the one's bit track also serves as a control track. The one's bit track effectively operates as a clock track to determine which of the other tracks are to be passed on as output information. The use of the double track system for the most of the bits allows the code wheel to provide output signals which are unambiguous as the code wheel changes its angular position. The unambiguousness of the output signals is produced by having one of the tracks of each pair of tracks lead the other track so as to have one or the other of the tracks being preset before the signal is actually read from the track. This presetting allows all the output signals to be in a stable condition before they are read by the photosensitive cell unit and also maintains the previous output signals in a stable condition until they are changed.

The freedom from ambiguity produced by the particular code wheel shown in FIG. 9 can be seen with reference to the portion of FIG. 9 which includes the dotted and solid lines. Below the dotted and solid lines, at the periphery of the code wheel, are a plurality of decimal numbers running from 0 to 9. The position of the decimal numbers illustrates the position of the code wheel relative to the photosensitive cell unit 202 when the code wheel represents the particular decimal numbers shown. Of course the code wheel has many more positions representing increasing decimal numbers. In the particular embodiment the code wheel is discretely subdivided to represent decimal numbers from 0 to 999.

The photosensitive cell unit 202, as shown in FIG. 7, has the plurality of active areas 218 arranged along a straight line. These active areas are arranged to extend radially across the code wheel so that each active area lines up with and overlays an individual track. For example, using the one's bit track as an illustration, an active area 218 would overlay either an opaque or a translucent portion of the track. In FIG. 9, opaque portions of a track are shaded and the translucent portions are left clear.

Above the plurality of decimal numbers running from 0 to 9, and within the one's bit track, are a plurality of solid and dotted lines. The solid line indicates that the active area 218 related to the one's bit track is over an opaque portion of the one's bit track. A dotted line indicates that the active area 218 related to the one's bit track is over a translucent portion. When the active area 218 is over a translucent portion, light energy is received by the active area and the photosensitive cell produces an output signal indicating that the one's bit is "On." The one's bit track alternately switches from "Off" to "On" as the relative position of the active area moves counterclockwise along the one's bit track.

Since the one's bit track alternately switches from "Off" to "On," the one's bit track can conveniently be used as a control track to determine which of the other tracks are to be used to produce the output signals.

For example, when the code wheel is in the position to produce binary coded decimal signals representing the decimal value of zero, the active areas 218 are lined up radially across the code wheel along a line extending from the center of the code wheel to the decimal number zero at the periphery.

The active area 218 associated with the one's bit for the above condition is represented by the solid line 302. As can be seen in FIG. 9, the solid line 302 runs through an opaque area of the track. There is a solid line 304 running through the 2 track and a dotted line 306 running through the 2' track with alternate solid and dotted lines running through the remaining tracks. The alternate solid and dotted lines are only shown illustrated through the 8' track but it is to be appreciated that the same principles extend through the entire twenty-three tracks.

The coding system is arranged so that whent he active area, represented by the solid line 302, indicates that there is no signal from the 1 track the system is then switched so that output signals are passed from the analog to digital converter from only those active areas which are designated by solid lines. These of course are the active areas represented by solid line 304 and the other solid lines along the same radial line. The active areas represented by the dotted lines are also reading, but their signals are not switched to the output. As indicated above the one's bit track which alternates between "Off" and "On" is used to provide the control of the switching.

As the code wheel rotates from a position representing the decimal value of zero to the decimal value of one, the active area associated with the one's bit now produces an output signal, since the active area is over a translucent portion of the track. This active area is represented by the dotted line 308. Additionally, the active areas represented by the dotted lines such as 310 and 312 are switched to produce the output signals and the active areas represented by the solid lines are switched so that they do not provide any output signals. Generally, it can be stated that when the active area associated with the one's bit track is represented by a solid line the other active areas along the same radial line, also represented by solid lines, are used to provide the output signal. Alternatively, the active areas represented by the dotted lines are used to provide for output signals when the active area associated with the one's bit track is represented by a dotted line. Since the one's bit is "Off" when the active area is represented by the solid lines, and since the one's bit is "On" when the active area is represented by the dotted lines, it can be stated that when the one's bit is "Off" the unprimed tracks are used to provide the output signals, and that when the one's bit is "On" the primed tracks are used to provide the output signals.

Notice that the active area represented by the solid line 314 is right on the edge of the opaque area. The active area, which is represented by the dotted line 310 in the 2 track is quite a bit in from the edge of the opaque area. Therefore, the reading from the active area represented by the dotted line 300 is desirable, since it is solidly in the opaque area and no false readings will occur from the 2' track. Having the active area represented by the solid line 314 right on the edge of the opaque area in the 2 track provides an important function. When the code wheel moves to its next position the 2 track changes and is preset before the one's bit track switches. Therefore, when the decimal value of two's is to be read from the code wheel, the active area associated with the 2 track is solidly over the translucent portion, even before the one's bit track switches to control the reading from the 2 track. The presetting insures a stable reading from the code wheel at all times.

The above type of presetting continues throughout any angular changes in position of the code wheel. The presetting occurs every time an active area is on the borderline between an opaque and a translucent portion. However, when the active area is on the borderline, that particular track is not being used to provide the output signal, but the adjacent track having the same bit value is used to provide the output signal. Since the presetting is accomplished when the active areas are on the borderline between opaque and translucent portions, the presetting occurs for either direction of rotation of the code wheel. This indicates that the presetting occurs whether the decimal values of the output signals are increasing or decreasing. For example, when the code wheel changes position from a representation of the decimal value of 8 to a decimal value of 7, the presetting also occurs. When the decimal value of 8 is being read from the code wheel, the 8 track is used to provide the output signal, and the 8' track is preset since the active area is on a boarderline. As the decimal representation changes to a decimal value of 7, the 8' track is preset to "Off" before the one's bit track switches.

The use of this alternate presetting and reading of the pairs of tracks provides a high degree of stability and unambiguousness from the analog to digital converter. This is particularly true when the analog to digital converter is used with very slow rotations of the code wheel. This has been a particular problem in the past, since the slowness of the rotation very easily allows output signals in ordinary analog to digital converters to be switching back and forth between readings before stability occurs. This switching back and forth produces false output signals which can disrupt other parts of the system.

It is to be appreciated that although the code wheel of FIG. 9 has been described with reference to the tracks having bit values of 1 to 8, the same principle follows for the remaining tracks having bit values of 10 to 800. It is also to be appreciated that although FIG. 9 illustrates a portion of the code wheel, the remaining portion of the code wheel is similar to and operates on the same principle as the particular portion illustrated and described.

It is further to be appreciated that although the one's bit track has been shown to serve two functions, that is, of a control track and an information track, a separate control track could be used and an additional one's bit track added in accordance with the presetting principle described with reference to the other tracks. The separate control track would be used to switch between the different groups of tracks in the same manner as the one's bit track does in the described embodiment. If a separate control track were used, the number of information tracks would therefore equal two times the number of bits. The principle described with reference to FIG. 9 could also be further extended by providing additional tracks for each bit so that even greater stability could be achieved.

Figure 10:
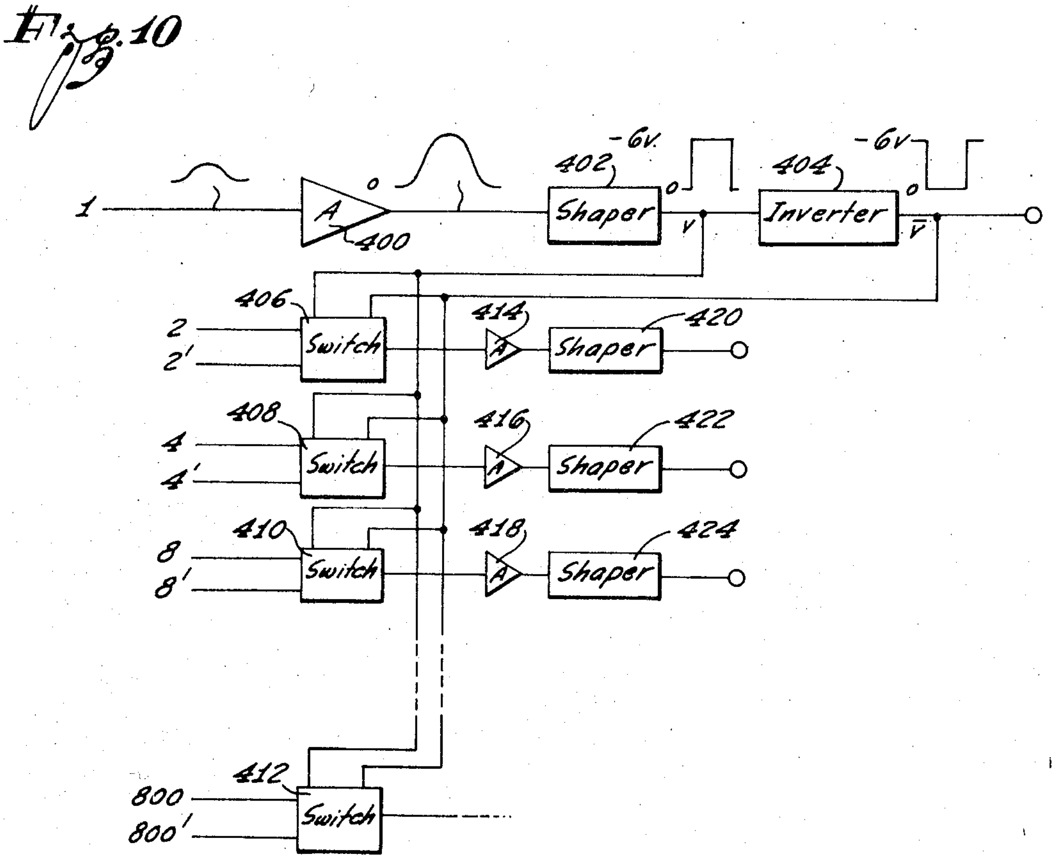
FIG. 10 illustrates a block diagram of an electrical system used to provide the proper output signals for the analog to digital converter of FIG. 1.

FIG. 10 illustrates a block diagram of a system for controlling which one of the pair of tracks for each bit is to be supplied as an output signal. In FIG. 10 information from the one's bit track is applied to an amplifier 400. The information signal as applied to the amplifier 400 has one of two states: First, the information signal is at a reference potential such as zero volts when the active area of the photosensitive cell is adjacent an opaque portion of the track. Second, the information signal has an amplified value when the active area of the photosensitive cell is opposite a translucent portion of the track. The information signal is amplified by the amplifier 400 to produce an output signal which swings between the reference potential such as zero volts and an amplitude value such as a minus potential.

The output signal from the amplifier 400 is applied to a shaper 402 which produces a square wave from the signal produced by the amplifier 400. The square wave may have a voltage swing between zero volts and 6 volts. The signal from the shaper 402 is applied to an inverter 404 which produces an inverted form of the signal from the shaper 402.

The pairs of signals from each pair of tracks representing an individual bit are applied to a plurality of switches represented by the switches numbered 406, 408, 410 and 412. It is to be appreciated that a great number of switches would be interposed between the switch 410 and the switch 412 in order to provide for the additional input signals not shown in FIG. 10.

The switches are controlled by output signals from the shaper 402 and the inverter 404. The output signals from the switches are applied to a series of amplifiers represented by the amplifiers 414, 416 and 418. The amplifiers amplify the signal in the same manner as amplifier 400 and the signals are then passed through shapers represented by shapers 420, 422 and 444 to produce square wave output signals. The square wave output signals are the binary coded decimal signals which are representative of the angular position of the code wheel which in turn is representative of the analog input information. It is again to be appreciated that many more amplifiers and shapers would be used for the additional bits of information.

In FIG. 10 the various wave forms shown represent the information from the one's bit track as it is progressively modified.

As explained with reference to FIG. 9, the information from the one's bit track operates as a control signal. When the one's bit is "Off" the unprimed tracks are used to provide the output information. When the one's bit is "On" the primed tracks are used to provide the output information. In FIG. 10, the control signals are developed from the one's bit information which are used to provide the control function. These control signals are respectively: the V signal from the shaper 402 and the $\overline{V}$ signal from the inverter 404. The V and $\overline{V}$ signals are applied to the switches to determine whether the primed or unprimed input information is passed to the output of the switches.

Figure 11:
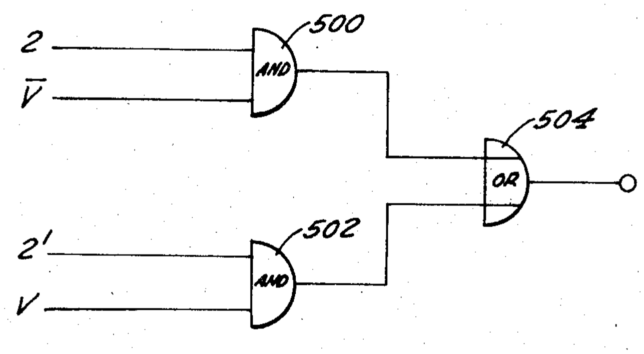
FIG. 11 illustrates a logic diagram of switching circuit which may be used for the switch illustrated in FIG. 10.

FIG. 11 illustrates a logic diagram of a switching circuit which may be used for the switches represented by the switches 406 through 412 shown in FIG. 10. The switching circuit illustrated in FIG. 11 consists of two and-gates 500 and 502 and one or-gate 504. Using the two tracks representing the two's bit information as an example, the signal from the 2 track is applied to the and-gate 500 and the signal from the 2' track is applied to the and-gate 502. The voltage V which is derived from the output of the shaper 402 in FIG. 10 is applied to the and-gate 502 and the voltage $\overline{V}$ which is derived from the output of the inverter 404 shown in FIG. 10 is applied to the and-gate 500.

As can be seen from FIG. 11, if the condition 2. $\overline{V}$ is true, an output is produced from the and-gate 500. If the condition 2' V is true, an output is produced from the and-gate 502. Since the conditions for the outputs from the and-gates 500 and 502 are mutually exclusive due to the conditions V and $\overline{V}$ it is only possible to have an output from one or the other of the and-gates. The outputs from the and-gates 500 and 502 are applied to an or-gate 504 which produces an output signal when either input condition is true.

It is to be appreciated that the invention has been shown with erference to a particular embodiment. It is obvious, however, that other embodiments may be used. For example, the analog to digital converter has been shown to produce an output signal when the individual photosensitive cells are opposite translucent portions on the tracks of the code wheel. It is to be appreciated that the coding system may be arranged so that an output signal would be produced when the individual photosensitive cells were opposite an opaque portion on the tracks of the code wheel. In using a system such as this, the code wheel of FIG. 9 would be a negative of the code wheel which would be used.

It is to be appreciated that other changes may be made. For example, as indicated above, it is not necessary to use the one's bit track as the control track, since it would be possible to use a separate track for the control track. The one's bit track could then have a second complementary track as do the remaining bits and the pair of one's bit tracks could be designed so as to eliminate any ambiguity. In accordance with the above, the invention is therefore only to be limited by the appended claims.

What is claimed is:

1. In an analog to digital converter, a lamp assembly, including a housing having a longitudinal opening in one wall of the housing, a plurality of the light sources within the housing behind the longitudinal opening, a flexible member attached to the housing for flexibly maintaining the light sources within the housing, a plurality of individual adjustment means operatively coupled to the light sources for producing movement of the light sources against the flexible member to individually adjust the position of the light sources relative to each other for producing the maximum uniform light energy from the longitudinal opening in the housing, a code device including tracks of binary coded decimal information operatively coupled to the lamp assembly and responsive to the light energy wherein movement of the code device presents successive portions of the tracks to the light energy to present successive binary coded decimal information in accordance with the movement of the code device, each track of binary coded decimal information representing a particular weighted numerical value and with at least some of the tracks grouped together in pairs and with a first one of each pair of tracks representing the same weighted numerical value as the second one of each pair of tracks and having the first one of each pair of tracks physically displaced to lead the second one of each pair of tracks, and a photosensitive cell unit, operatively coupled to the code device and responsive to light energy as modified by the code device, including a block of first semiconductor material serving as a base, and a plurality of individual portions of a second complementary semiconductor material disposed on one surface of the block of first semiconductor material and with the individual portions of second semiconductor material serving as individual photosensitive cells for each track on the code device by producing current flow through the individual functions between the first and second semiconductor materials when light energy as modified by the code device impinges on the individual portions of second semiconductor material.

2. In an analog to digital converter, a lamp assembly, including a housing having a longitudinal opening in one wall of the housing, a lens element in the longitudinal opening, a plurality of light sources within the housing behind the lens element in the longitudinal opening, a reflector element within the housing behind the light sources to collect stray light energy and direct the stray light energy toward the lens element, a flexible member attached to the housing for flexibly maintaining the light sources within the housing, a plurality of individual adjustment means operatively coupled to the light sources for producing movement of the light sources against the flexible member to individually adjust the position of the light sources relative to each other for producing the maximum uniform light energy from the lens element in the longitudinal opening in the housing, an optical code wheel including concentric tracks of binary coded decimal information operatively coupled to the lamp assembly and responsive to the light energy from the lens element across the concentric tracks wherein rotation of the code wheel presents successive portions of the concentric tracks to the light energy to present successive binary coded decimal information in accordance with the rotation of the code wheel, each concentric track of binary coded decimal information having opaque and translucent portions representing the "Off" and "On" states of a particular weighted numerical value and with all but one of the concentric tracks grouped together in pairs and with a first one of each pair of tracks representing the same weighted numerical value as the second one of each pair of tracks and having the first one of each pair of tracks physically displaced to lead the second one of each pair of tracks, a photosensitive cell unit operatively coupled to the code wheel and responsive to the light energy as modified by the code wheel, including a block of a first semiconductor material serving as a base, a plurality of individual portions of a second complementary semiconductor material disposed on one surface of the block of first semiconductor material and with the individual portions of the second semiconductor material disposed adjacent to each other and arranged longitudinally along the one surface of the block of first semiconductor material, and a plurality of individual metallic portions serving as an optical mask for the second semiconductor material to produce a plurality of exposed areas of second semiconductor material arranged in a longitudinal line along the one surface of the block of first semiconductor material and with the exposed areas operating to receive the light energy as modified by the code wheel and with the plurality of individual metallic portions additionally serving as electrical contact points for the portions of second semiconductor material.

References Cited

UNITED STATES PATENTS

| | | | |
|---|---|---|---|
| 1,408,875 | 3/1922 | Foley | 88—24B |
| 1,654,391 | 12/1927 | Thornton | 88—24B |
| 3,022,500 | 2/1962 | Stupar | 340—347 |
| 3,024,990 | 3/1962 | Magnuson | 340—347 |
| 3,054,996 | 9/1962 | Spaulding et al. | 340—347 |
| 2,766,446 | 10/1956 | Bland | 340—347 |
| 2,921,204 | 1/1960 | Hastings | 340—347 |
| 3,029,682 | 4/1962 | Wood | 250—220 |
| 3,286,251 | 11/1966 | Byun | 340—347 |
| 3,445,841 | 5/1969 | Parkinson | 340—347 |

MAYNARD R. WILBUR, Primary Examiner

J. GLASSMAN, Assistant Examiner